H. GREENER.
CARTRIDGE FOR SMALL ARMS, MACHINE GUNS, AND THE LIKE.
APPLICATION FILED SEPT. 13, 1918.
1,376,530.
Patented May 3, 1921.
2 SHEETS—SHEET 1.
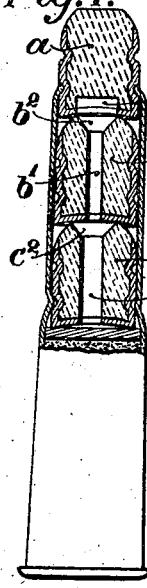
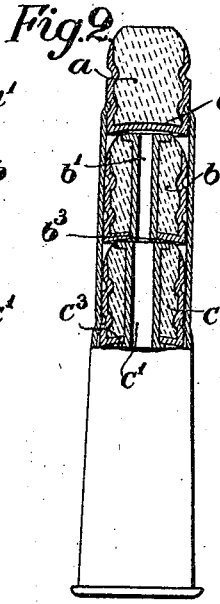
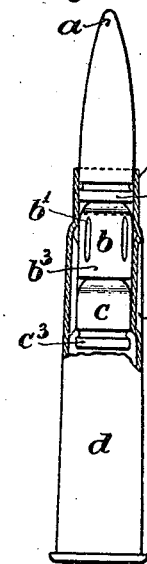
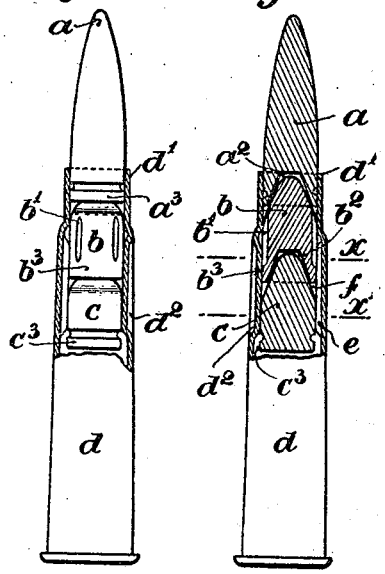
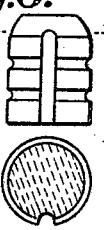
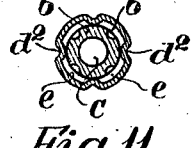
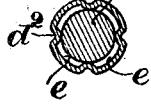
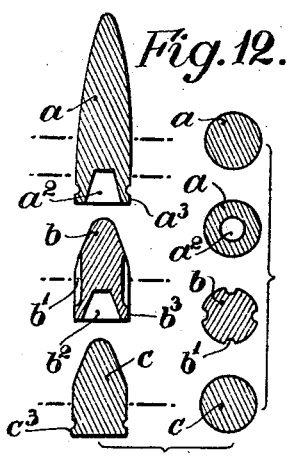
Harry Greener
Inventor
by Laurence Laugner
Attorney H. GREENER.
CARTRIDGE FOR SMALL ARMS, MACHINE GUNS, AND THE LIKE.
APPLICATION FILED SEPT. 13, 1918.
1,376,530.
Patented May 3, 1921.
Fig.13.
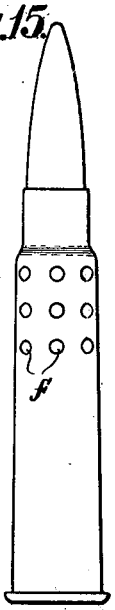
Fig.15.
Fig.14.
Fig.16.
Fig.17.
Fig.18.
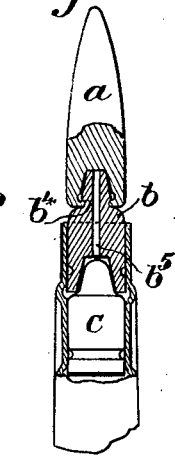
Fig.19.
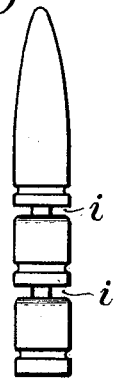
Fig.20.
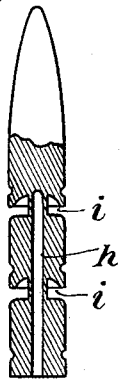
Fig.21.
Harry Greener
Inventor
by Laurence Langner
Attorney

UNITED STATES PATENT OFFICE.

HARRY GREENER, OF BIRMINGHAM, ENGLAND.

CARTRIDGE FOR SMALL-ARMS, MACHINE-GUNS, AND THE LIKE.

1,376,530.  Specification of Letters Patent.  Patented May 3, 1921.

Application filed September 13, 1918. Serial No. 253,975.

*To all whom it may concern:*

Be it known that I, HARRY GREENER, subject of the King of Great Britain and Ireland, and resident of Birmingham, in the county of Warwick, England, have invented certain new and useful Improvements in Cartridges for Small-Arms, Machine-Guns, and the like, of which the following is a specification.

This invention has reference to rifle, machine-gun and like cartridges or ammunition of the kind in which a plurality of projectiles are disposed one in advance of another in front of a propelling charge, with the object of providing for the simultaneous firing of a number of projectiles at one discharge from a single barrel.

If several solid elongated bullets are placed one in front of another in the case of an ordinary rifle cartridge with the object of obtaining somewhat the effect of a shot-gun, the result will be quite unsatisfactory as, owing to the bullets being in direct contact with one another and to the manner in which gas pressure would be transmitted to them, they would "upset" at the muzzle and lose the initial rotation imparted to them by the rifling. They would also, by tumbling end-over-end, quickly lose forward velocity and power of penetration, and accurate shooting, even at short ranges, would be an impossibility.

It has been realized that, to obtain accurate shooting with ammunition of this kind, it is essential to effect the separation of the respective bullet-elements during their passage along the bore of the barrel, or in some way or other to insure the independent departure of each such element at the muzzle, and my invention consists in improved plural-bullet cartridges in which either the bullet elements, or the cartridge case, or both the bullets and the case, are so formed or constructed and arranged that the desired initial separation and independent departure of the several projectiles or bullet-elements is effected solely by the gas pressure which is developed by the ignition of one main or propellant charge.

In the accompanying drawings, I have illustrated, by way of examples, several methods of carrying my invention into practical effect in connection with rifle and machine-gun ammunition.

Figure 1 is a longitudinal section of a rifle cartridge in which three elongated projectiles or bullet elements are provided.

Fig. 2 is also a longitudinal section showing a similar cartridge in which the plural bullet elements are somewhat differently formed.

Figs. 3 to 6 inclusive illustrate several forms of gas passages which differ from the arrangement shown in Figs. 1 and 2.

Fig. 7 is an elevation of a plural bullet cartridge having a modified form of case.

Fig. 8 is a view in which the case is shown in section to expose the several bullets in elevation.

Fig. 9 is a view showing both the bullet containing part of the cartridge and the bullets themselves in section.

Figs. 10 and 11 are transverse sections taken respectively on the lines $x$ and $x'$ in Fig. 9 showing internal gas passages produced by the inward crimping of the walls of the cartridge case.

Fig. 12 illustrates in longitudinal and transverse sections the several bullets detached and separated.

Figs. 13 and 14 are views in elevation and transverse section respectively illustrating a modified method of producing the gas passages.

Figs. 15 and 16 are views similar to Figs. 13 and 14 showing a further modification.

Fig. 17 illustrates another method in which the casing is formed with annular grooves so as to present longitudinal corrugations.

Figs. 18 and 19 illustrate a further development of the invention in which the leading element is located outside the case while being firmly or rigidly but separately connected with the next element.

Figs. 20 and 21 are views in elevation and longitudinal section respectively showing a modified construction of plural bullet in which the separation of the several bullets is effected by fracture incidental to the pressure of gas developed in the gas passage.

According to one form of the invention (which is shown in Fig. 1 of the said drawings in its application to a caliber .380 rifle cartridge) the cartridge embodies or is provided with three elongated projectiles or bullet-elements $a$, $b$, and $c$, which are secured in axial alinement in the neck of the cartridge shell. The foremost element $a$, which is solid and may be shaped like the nose or pointed portion of an ordinary bullet, may be so fixed in the shell that the same mainly projects beyond the front of the neck, and its base is preferably cupped, dished, or recessed at $a^1$. The other two elements $b$ and $c$ are each bored with an axial hole or gas-passage ($b^1$, $c^1$) each merging at its forward end, into a conical or cupped enlargement ($b^2$, $c^2$) which constitutes a small gas-expansion chamber, and which, when the elements are in position in the cartridge, is opposed to the base of the element in front of it.

The gas-passages $b^1$, $c^1$, are of different calibers, the hole in the rearmost or innermost section being (as in the cartridge shown in Fig. 1) made larger in the bore than the hole in the next or intermediate element, and if desired, the holes may be fitted with hard metal liners to prevent displacement of the softer metal body parts of the elements by the passage of the powder gases.

In this particular cartridge, the initial separation and independent departure of the projectiles is insured by the use of bullet-elements having gas-passages of different calibers as described; it being understood that as the bore of the passage in the innermost element is larger than that in the next element, the gas-passage formations exercise a controlling or regulating effect which so distributes the gas pressure over the several elements that the leading or nose element is driven first from the cartridge case, followed in succession by the other elements. That is to say, the elements are separated at or from the very commencement of their movement and are kept separate or apart during their passage along the bore of the barrel by the volumes of gas that drive forward through the holes in the said elements, which not only realizes the desired independent departure of each element at the muzzle but also enables the individual elements to retain the axial rotation imparted by the barrel rifling in just the same way as a single bullet would do.

It is to be understood that the relative proportions of the bore-dimensions of the gas passages in the inner elements should be selected with proper regard to the weight of the respective projectiles so as to realize an equalized distribution of the gas pressure over the whole of the said elements, and further, by suitably varying the factors of the bullet-element weight and the relative bore-dimensions of the gas passages, or both, provision may be made for insuring the discharge of each element at the same velocity, or, alternatively, to impart relatively higher velocity to the leading element or elements so as to attain increasing separation of the projectiles during their flight through the air.

Fig. 2 shows a section of another .380 cartridge, wherein the plural-bullet elements are rather differently formed to those of the cartridge shown in Fig. 1. Here each of the elements $a$, $b$, and $c$, has a dished or concaved base $a^3$, $b^3$, $c^3$, and the noses of the elongated elements are rounded or shaped so that, when they are secured in the cartridge-case, there exist between $c$ and $b$, and between $b$ and $a$, spaces within which the gases driven through the passages $c^1$, and $b^1$, can expand to assist the initial separation of the said elements.

The number of bullet-elements embodied in a cartridge may be varied as desired, as also may the size and shape of the elements and the disposition and cross-sectional shape of the gas-passages, according to the effects desired in regard to the separation of the said elements and their relative velocities.

Further, instead of the gas-passages being axial as shown in Fig. 1, they may pass obliquely from the base to the front (see Fig. 3); or there may be two (or more) holes formed either in parallel directions through the bullet (Fig. 4) or in oblique relationship to one another (Fig. 5); the rear ends of such holes preferably starting in a recess or sinking in the base of the element. Or the gas-passage or passages may take the form of one or more grooves or gutters in the outer surface of the element as shown in Fig. 6.

Instead of providing for the independent propulsion and separation of the bullet-elements solely by forming gas-passages in the elements themselves, the case of the cartridge may be formed or constructed in such a manner that the gases developed on ignition of the propellant charge can be utilized to effectively propel a series or plurality of solid projectiles or bullet-elements.

According to one method of realizing this effect, I propose to form, in the walls of the part of the cartridge case wherein the bullet-elements are contained, and inward of the neck of the said case, a series of longitudinal grooves produced by inwardly displacing the metal along straight or spiral lines at suitable angular distances apart around the case, so that when the bullet-elements are in position in said grooved or crimpled portion of the case, there will exist between the bullets and the inside of the said case, a series of separated passages or clearances wherethrough powder-gases may proceed to act upon and independently propel the bullet-elements in front of the rearmost or innermost elements.

Referring now to Figs. 7 to 12 inclusive in this cartridge, there are three solid bullet-elements $a$, $b$, and $c$, shaped as shown in the sectional view, Fig. 9, and the walls of the cartridge case $d$, immediately below the neck $d^1$, are formed with longitudinal crimpings $d^2$ to produce, between the inner walls of the case and the bullets that are contained in the crimped portion, a series of internal gas passages $e$ which are open at the lower ends to the part of the case that contains the propelling charge while their upper ends are closed by the neck. These passages $e$ provide for the transmission of gas-pressure from the propelling charge to the expansion space that exists at $f$ between the inner bullet $c$ and the middle one $b$ and enable the separation and independent propulsion of the latter to be effected. If desired, the passages produced by the crimping may be adapted for also transmitting gas pressure into the expansion space between the bullets $b$ and $a$ for similarly effecting the separation and propulsion of the leading or nose element $a$, but in the particular construction shown in Figs. 7 to 12, the transmission of gas pressure to the leading bullet is provided for by forming, in the periphery of the front portion of the middle bullet $b$, a series of grooves or gas passages $b^1$ which communicate at their inner ends, with the case passages $e$ and at their forward ends with the expansion space between the bullets $a$ and $b$.

The relative sizes or cross-sectional areas of the passages $e$ and $b^1$ are selected so that they will control the distribution of the gas pressures over the bases of the bullets $a$ and $b$ in accordance with the general principle involved in my invention; the case-passages $e$ being made of larger sectional area than the passages or grooves $b^1$ in the middle bullet.

In this particular cartridge, all the bullets have pointed noses and the bases of the bullets $a$ and $b$ are formed with cups or recesses at $a^2$, $b^2$, into which the noses of the bullets behind them socket or telescope; the said socketing parts being shaped so that there will exist between the bullets $a$ and $b$, and also between $b$ and $c$, the necessary expansion spaces into which the powder gases are conveyed by the gas-passage system to effect the early separation of the various elements.

The base of the bullet $b$ in which the passage-grooves $b^1$ are formed is left solid so that the solid or ungrooved part $b^3$ may take and fill the rifling of a barrel and act as a gas check; similar gas-checks $a^3$, $c^3$, being also formed at the bases of the bullets $a$ and $c$.

Instead of forming the case with a series of separated grooves or the like, the bullet-containing portion inward of the neck may be made of corrugated cross-section as shown in Figs. 13 and 14 to produce a series of contiguous straight (or spiral) internal gas-passages $e$ all around the circumference; or instead of displacing the metal to produce the required longitudinal or spiral passages or gas clearances, the same effect may be attained by cutting or machining internal grooves or channels in the metal of the case.

Further, instead of forming the case with grooves, corrugations or the like, to produce internal channels or passages for gas, much the same result may be attained by indenting the bullet-containing part of the case at suitable points (see Figs. 15 and 16) to produce a series of internal studs or "pimples" $f$ which hold the bullet-elements clear of the inner walls of the case when the said elements are introduced into the necked end of the said case and allow the gases to pass between them.

As another method of attaining the object of the invention, a series of circumferential and contiguous grooves may be formed by annularly crimping or displacing suitable portions of the bullet-containing part of the cartridge-case as shown in Fig. 17 so that the said case is corrugated in longitudinal section along the part that incloses the innermost bullet-elements, and this corrugated portion is adapted, under the action of the powder gases, to straighten or flatten out, or assume a more or less cylindrical formation, thus producing, between the inside of the case and the peripheries of the bullet elements, clearances wherethrough gases can pass to act against the leading elements as in the previously-described forms of the invention.

The whole of the constructions above described are adapted for use with bullet-elements which have either pointed noses or cupped or concaved bases or both, or are otherwise shaped so that there will exist, between the front of one element and the base of the next, a space within which the gases directed thereinto by the case (or case and bullet) formations may expand to effect the necessary separation of the several elements during their passage along the lead and bore of a rifled barrel.

In all these applications of the invention certain of the bullet-elements contained or inclosed in cartridge-cases may be formed with one or more longitudinal depressions or grooves that act as supplementary gas-passages for assisting the direction of the gases into the spaces between the elements, but preferably and in order to reduce or obviate gas-leakage past the said elements during their passage along a rifled bore, the said grooves or depressions are of short length only and do not open to or communicate with the rear or base end of the element.

In applying my invention to a .303 or similar short-necked cartridge having a pointed bullet which extends some distance beyond the front of the neck, I may, according to a further modification or development of my original invention, adopt a plural bullet in which the pointed leading or nose element *a* (which may be located wholly outside the case as shown in elevation in Fig. 18 and in section in Fig. 19) is firmly or rigidly but separably connected to the next element *b* by some suitable method or means which will admit of the separation and propulsion of the two elements by the action of the powder gases when the propelling charge is fired. In the cartridge represented in the said Figs. 18 and 19, the connection between the socketed or telescoping ends of the two bullets is made by crimping or closing the base of the bullet *a* into a groove $b^4$ in the nose or front of the bullet *b* and the said bullet *b* is formed with an axial gas passage $b^5$ to provide for the transmission of gas pressure to effect the separation of the said bullets on discharge of the cartridge.

A plural-bullet comprising two elements connected in this way may be embodied in a cartridge case having internal gas passages produced or formed by any of the methods herein referred to; the cartridge shown in Figs. 18 and 19 having longitudinal crimpings as in Figs. 7 to 12 wherethrough gases generated by the ignition of the propelling charge are driven into the expansion space between the bullets *b* and *c* and from which expansion space gases also drive through the axial gas-passage of the bullet *b* for effecting the separation and propulsion of the un-inclosed nose-bullet *a*.

This method of separably connecting the bullet-elements may also be applied to cartridges in which the base of the leading or nose element is inclosed or secured within the neck of the case.

Bullet-elements arranged as in Figs. 18 and 19 may alternatively be connected by metal ferrules, rings, bushes, or the like, adapted to burst and release the elements under gas pressure.

Or, as another development, a plural-bullet may (as shown in elevation in Fig. 20 and in section in Fig. 21) be made in one solid piece, bored with a gas-passage *h* from the rear, and in which deep annular grooves *i* are cut at suitable distances apart so that the portions on either side the grooves are connected or held together by metal collars which will break or burst, and allow the said portions to separate when gas pressure is developed in the gas-passage.

It is considered that the above-described invention enables a given propellant charge to be utilized more efficiently, or with maximum advantage, owing to the fact that the energy developed on discharge is distributed over or exerted simultaneously upon the bases or ends of a number of projectiles instead of being concentrated on one bullet. Moreover, the nature of the resistance to gas-pressure set up by a series of bullet-elements departing in succession from a cartridge-case has been found to result in a much more complete combustion of the propellant charge than is normally realized, and this factor enables a given charge to efficiently propel a series of bullets whose aggregate weight exceeds that of any single bullet which could be effectively propelled by the same charge; the greater resistance to the developed pressure imposed by the greater bullet weight being compensated by the higher pressure resulting from the complete burning of the charge and the manner in which such pressure is controlled and distributed.

Having described my invention, what I claim and desire to secure by Letters Patent is:—

1. A cartridge comprising a case, a plurality of bullets carried thereby and arranged in axial alinement, and a propelling charge disposed in the case solely and entirely in the rear of the innermost bullet, gas spaces being provided between the successive bullets adapted to communicate with one another to effect the initial separation and independent departure of the several bullets by the gas pressure developed solely by the ignition of the propelling charge.

2. A cartridge comprising a case, a plurality of bullets carried thereby and arranged in axial alinement, a propelling charge disposed in the case solely and entirely in the rear of the innermost bullet, the cartridge being provided with gas spaces between the successive bullets, and gas passages for transmitting the gas pressure to the gas spaces.

3. A cartridge comprising a case, a plurality of bullets carried thereby and arranged in axial alinement a propelling charge disposed in the case solely and entirely in the rear of the innermost bullet, the cartridge being provided with gas spaces between the successive bullets, and gas passages for transmitting the gas pressure to the gas spaces the passages being formed in the cartridge case.

4. A cartridge comprising a case a plurality of bullets carried thereby and arranged in axial alinement a propelling charge disposed in the case solely and entirely in the rear of the innermost bullet the cartridge being provided with gas spaces between the successive bullets and gas passages for transmitting the gas pressure to the gas spaces the gas passages being formed by crimpings in the cartridge case below the neck thereof.

5. A cartridge comprising a case a plurality of bullets carried thereby and arranged in axial alinement a propelling charge disposed in the case solely and entirely in the rear of the innermost bullet, the cartridge being provided with gas spaces between the bullets and gas passages for transmitting the gas pressure to the gas spaces the gas spaces being formed partly in the cartridge case and partly in the periphery of the inclosed bullet.

In testimony whereof I affix my signature.

HARRY GREENER.